United States Patent
Le et al.

(10) Patent No.: US 6,920,523 B2
(45) Date of Patent: Jul. 19, 2005

(54) BANK ADDRESS MAPPING ACCORDING TO BANK RETENTION TIME IN DYNAMIC RANDOM ACCESS MEMORIES

(75) Inventors: Thoai-Thai Le, Cary, NC (US); Stephen Bowyer, Raleigh, NC (US)

(73) Assignee: Infineon Technologies AG, Munich (DE)

( * ) Notice: Subject to any disclaimer, the term of this patent is extended or adjusted under 35 U.S.C. 154(b) by 261 days.

(21) Appl. No.: 10/265,964

(22) Filed: Oct. 7, 2002

(65) Prior Publication Data

US 2004/0068604 A1 Apr. 8, 2004

(51) Int. Cl.[7] .............................................. G06F 12/00
(52) U.S. Cl. .......................... 711/106; 711/5; 711/158; 711/165; 711/202
(58) Field of Search ................................ 711/106, 202, 711/206–209

(56) References Cited

U.S. PATENT DOCUMENTS

| | | | | |
|---|---|---|---|---|
| 6,446,159 B2 | * | 9/2002 | Kai et al. ................... | 711/106 |
| 6,557,072 B2 | * | 4/2003 | Osborn ...................... | 711/106 |
| 2003/0028711 A1 | * | 2/2003 | Woo et al. .................. | 711/106 |

* cited by examiner

Primary Examiner—Mano Padmanabhan
Assistant Examiner—Paul Baker
(74) Attorney, Agent, or Firm—Moser, Patterson & Sheridan, L.L.P.

(57) ABSTRACT

A system and method for refreshing data in a dynamic random access memory ("DRAM") is provided, where the system includes a data memory having a plurality of memory banks, a map memory in signal communication with the data memory for translating an internal address of each of the plurality of memory banks into a corresponding external address, a map comparator in signal communication with the map memory for selectively enabling a memory bank in accordance with its external address, a refresh address generator in signal communication with the map comparator for selectively refreshing the enabled memory bank in accordance with its external address, and a refresh counter in signal communication with the refresh address generator for signaling a refresh in accordance with the maximum required refresh time of the enabled memory bank; and where the corresponding method includes determining the maximum required refresh period for each of the memory banks, respectively, prioritizing the memory banks in accordance with their respective refresh periods, utilizing the memory banks in order of their respective prioritizations, selectively disabling at least one of the memory banks in reverse-order of their respective prioritizations, and refreshing only the remaining non-disabled memory banks.

18 Claims, 4 Drawing Sheets

US 6,920,523 B2

BANK ADDRESS MAPPING ACCORDING TO BANK RETENTION TIME IN DYNAMIC RANDOM ACCESS MEMORIES

BACKGROUND OF THE INVENTION

The present disclosure relates to dynamic random access memories ("DRAMs"), and more particularly, to a method and apparatus for mapping memory bank addresses relative to memory bank retention times in DRAMs.

In a typical computing system, a memory hierarchy supports a central processing unit ("CPU") with data storage capabilities. Generally, the type of memory device used as the primary random access memory ("RAM") in a computing system is dynamic random access memory ("DRAM"). DRAM is comparatively low in cost and high in density, facilitating the storage of large quantities of data within a small volume of the computing system.

Unlike static random access memory ("SRAM"), which generally has a lower density than DRAM, data stored in DRAM must be refreshed periodically to prevent the data from being lost due to charge leakage from the DRAM cells. This typically results in correspondingly higher power consumptions for computing systems using DRAM.

Since data stored in DRAMs is destroyed after being idle for a period of time, DRAMs require refresh cycles to restore their data. Memory cells in DRAMs must be periodically refreshed within a certain period of time. This period of time is called the "retention time". Depending on such factors as the chip technology and the chip temperature, the retention time may range from a few milliseconds to hundreds of milliseconds.

Each DRAM memory may be organized into arrays or banks. Data refresh is typically accomplished by accessing each row in each memory bank, one row in each bank at a time. When the memory banks are accessed to be refreshed, data stored in memory cells of the banks are read to sense-amplifiers, and immediately written back to the memory cells. A capacitor corresponding to each memory cell is thus recharged to its initial value. Such refresh cycles in DRAMs consume power, which may be at a premium in battery-powered mobile computing systems, for example.

Accordingly, what is needed is a system and method for reducing the power consumption of DRAM devices that is suitable for use in battery-powered mobile computing systems.

SUMMARY OF THE INVENTION

These and other drawbacks and disadvantages of the prior art are addressed by a system and method for mapping memory bank addresses relative to memory bank retention times in DRAMs. The system includes a data memory having a plurality of memory banks. Each bank is a collection of rows, which means that the mapping is not necessarily restricted in a bank, but can cover part of a bank. A map memory is in signal communication with the data memory for translating an internal address of each of the plurality of memory banks into a corresponding external address, a map comparator in signal communication with the map memory for selectively enabling a memory bank in accordance with its external address, a refresh address generator in signal communication with the map comparator for selectively refreshing the enabled memory bank in accordance with its external address, and a refresh counter in signal communication with the refresh address generator for signaling a refresh in accordance with the maximum required refresh time of the enabled memory bank.

The corresponding method for mapping memory bank addresses relative to memory bank retention times in DRAMs includes determining the maximum required refresh period for each of the memory banks, respectively, prioritizing the memory banks in accordance with their respective refresh periods, utilizing the memory banks in order of their respective prioritizations, selectively disabling at least one of the memory banks in reverse-order of their respective prioritizations, and refreshing only the remaining non-disabled memory banks.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for mapping memory bank addresses relative to memory bank retention times in DRAMs, in accordance with the following exemplary figures, in which.

DETAILED DESCRIPTION OF PREFERRED EMBODIMENTS

A system and method are provided for mapping memory bank addresses relative to memory bank retention times in dynamic random access memories ("DRAMs"). Battery-powered mobile computing systems, for example, typically have a power-down mode to reduce power consumption by the display and/or other peripheral devices during periods of low usage. Thus, the present disclosure presents a system and method to further reduce the power consumption of a DRAM device. A feature referred to as a "partial array self-refresh" has been introduced in mobile DRAMs. This feature allows the DRAM chip to refresh only selected banks during a power-down mode. Either one bank, two banks or all banks may be activated and refreshed during the power-down mode. Non-activated banks are not refreshed, and are permitted to lose their data.

As the array sizes of current DRAM chips continue to be increased, the likelihood of having banks with different retention times is also increased. Thus, to further minimize power consumption, a bank re-mapping relative to the retention times is presented in this disclosure. By prioritizing the banks in accordance with their retention times, the bank with the longest retention time will be automatically selected first. Thus, when several banks are not required, the total refresh energy is already reduced by eliminating the need to refresh one or more banks. The total refresh energy is further reduced since the higher prioritized remapped banks have longer refresh periods than those banks given the lower re-mapping prioritizations.

A circuit embodiment is implemented by mapping the external bank addresses to the internal bank addresses according to their retention times, thus the external bank addresses $BA_{ext}$ are mapped to the internal bank addresses $BA_{int}$ in accordance with thier respective retention times $t_{retention}$ by a mapping function $BA_{int}=f(BA_{ext}, t_{retention})$ Thus, the internal bank address is selected according to an ascending or descending refresh period by a multiplexer following determination of the refresh period for each bank. For example, $BA_{int}<0>$ may be set to correspond to the bank with the longest retention time while $BA_{int}<3>$ may be set to correspond to the bank with the shortest retention time. In alternate embodiments, selection of the refresh periods and bank address mappings can be programmed via fuse options and/or programmable elements, such as, for example, EPROMs and flash memories.

Detailed illustrative embodiments of the present invention are disclosed herein. However, specific structural and functional details disclosed herein are merely exemplary for purposes of describing preferred embodiments of the present invention. The same refresh concept can be applied to any dynamic random access memory ("DRAM"), including those used for cache level memories.

Figure 1:
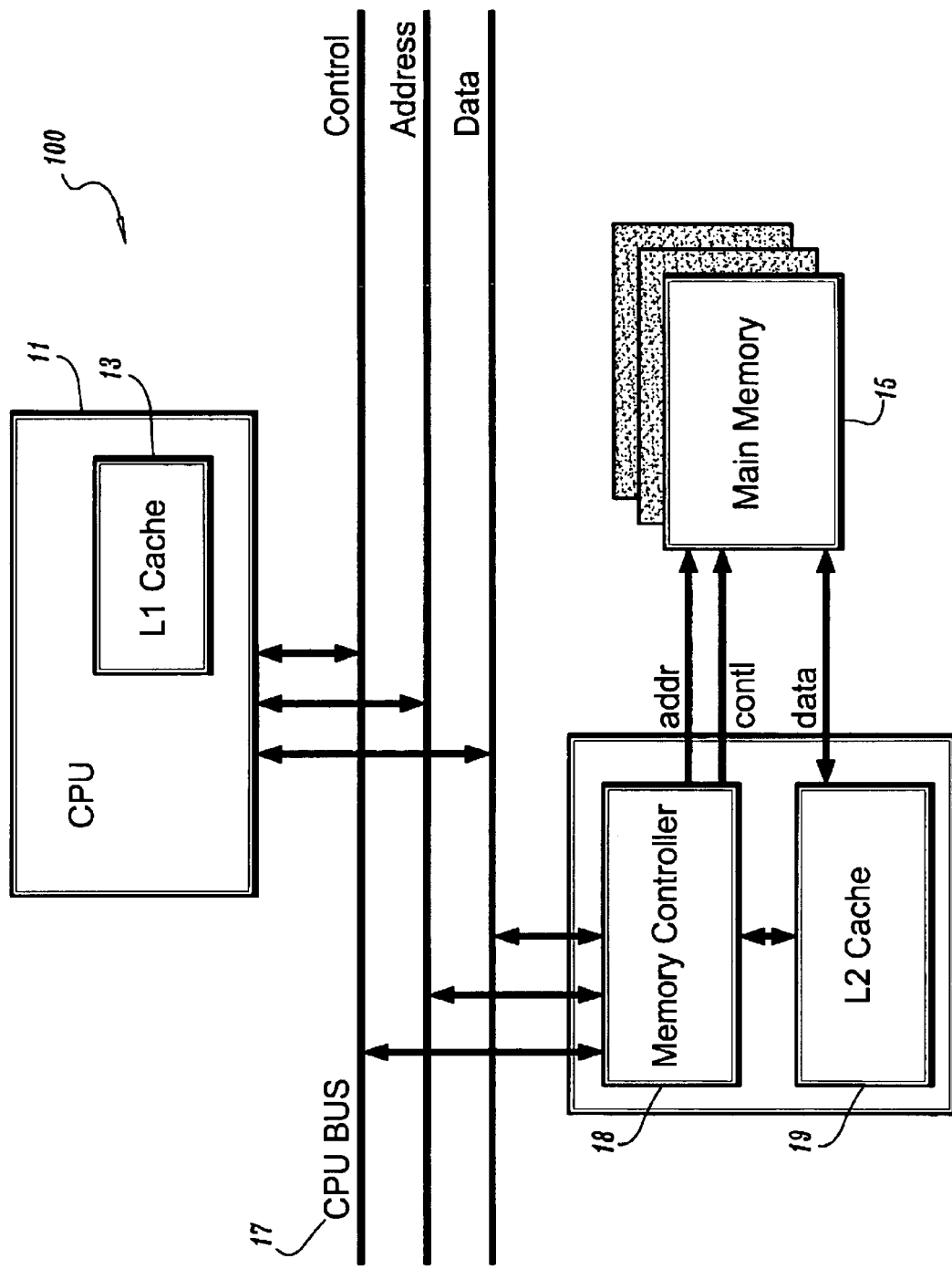
FIG. 1 shows a block diagram of a computing system with memory where exemplary embodiments of the present disclosure are applied.

As shown in FIG. 1, a memory organization for a computing system is generally indicated by the reference numeral 100. The computing system 100 includes a central processing unit ("CPU") 11 with an "on-chip" cache memory ("L1 Cache") 13, a main memory 15, a CPU bus 17, a memory controller 18 for controlling data traffic on the CPU bus 17, and a second level cache memory ("L2 Cache") 19.

The first level cache memory 13 is integrated on the same chip with the CPU 11. The first level cache memory 13 is faster because it is integrated with the CPU 11 with a higher bandwidth and shorter wire length and therefore avoids any delay associated with transmitting and/or receiving signals to and/or from an external chip. The second level cache memory 19 is located on a different chip than the CPU, and has a larger capacity than the first level cache memory 13 but smaller than a main memory 15. Here, the second level cache memory 19 is implemented in DRAM.

The cache memories 13 and 19 serve as buffers between the CPU 11 and the main memory 15. In each of the cache memories 13 and 19, data words are stored in the cache memory and grouped into small pages called 'cache blocks' or 'cache lines'. The contents of the cache memory are a copy of a set of main memory blocks. Each cache line is marked with a "map address". Thus, each cache line knows what part of the main memory the cache line belongs to. Map addresses, which may be non-contiguous, that are assigned to the corresponding cache lines are stored in a special memory, called a "map memory" or "directory".

In the first level cache memory 13, when an address is requested by the CPU 11 to access certain data, if the requested address is not found in the L1 cache memory 13, it is determined that the data corresponding to the requested address is not present in the cache memory 13, which is referred to as "miss". When a miss occurs in the first level L1 cache memory 13, the requested address is sent to a lower level memory, such as, for example, the second level L2 cache memory 19. The data access process in the second level cache memory is described in detail below. If a "miss" occurs in the second level cache memory 19, the requested address is sent to the main memory 15.

The computing system preferably employs SRAM for the first level cache memory 13 and DRAM for the second level cache memory 19, no data refresh process is required for the first level cache memory 13. Thus, a method of refreshing data according to the present invention is described with respect to the second level cache memory 19. However, it should be noted that the present invention is equally applicable to any DRAM memory, such as, for example, any DRAM memory used anywhere in a hierarchical memory system.

Figure 2:
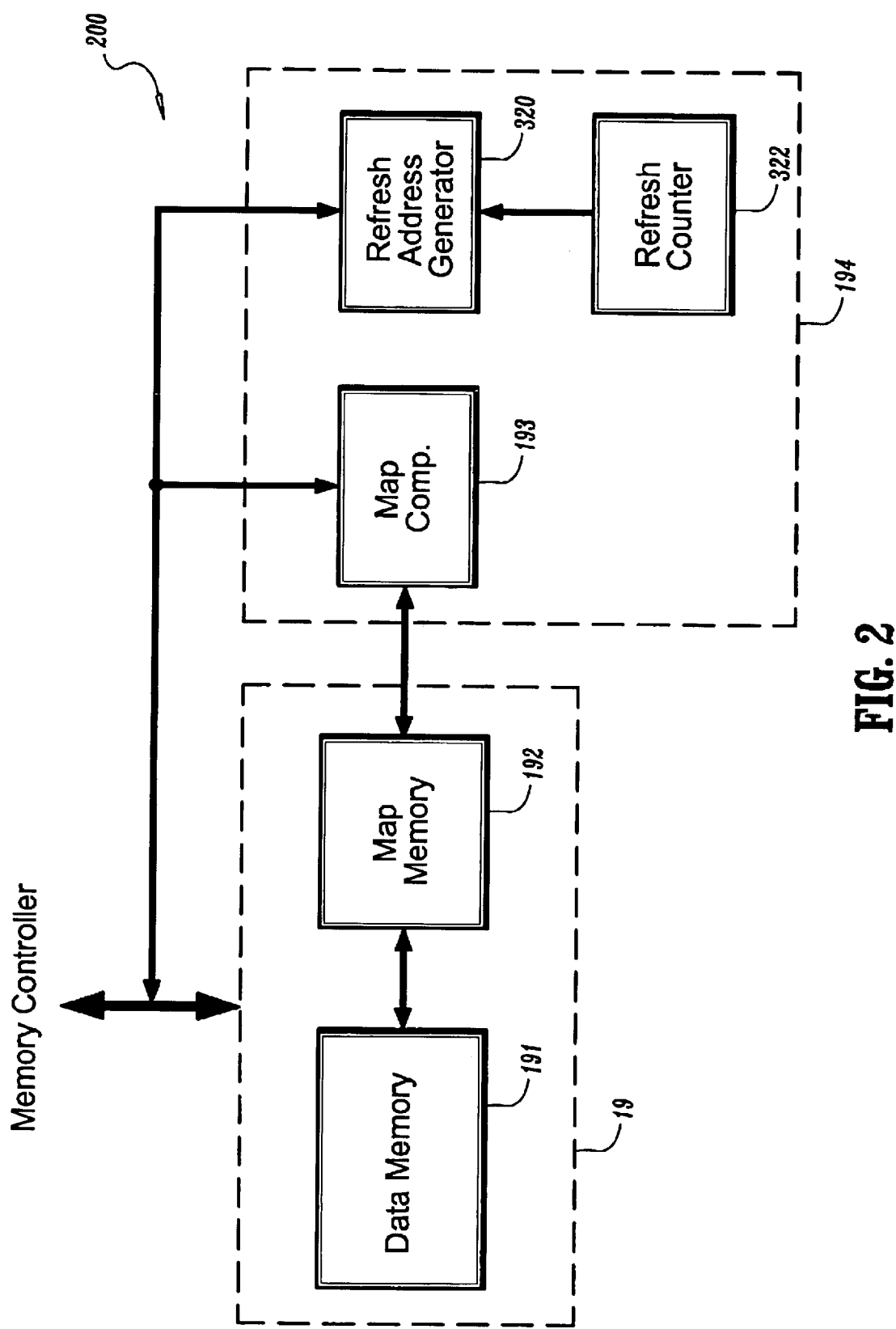
FIG. 2 shows a block diagram illustrating a DRAM memory of FIG. 1.

Referring to FIG. 2, a DRAM is generally indicated by the reference numeral 200. Here, the second level L2 cache memory 19 includes a data memory 191 and a map memory 192. The data memory 191 stores data with a higher probability of being selected by the CPU 11 of FIG. 1, and the map memory 192 stores map addresses, each addressing a corresponding cache line of the data stored in the data memory 191.

Thus, when a miss occurs in the first level L1 cache memory 13 of FIG. 1, a requested address made by the CPU is loaded on the CPU bus 17 of FIG. 1 to be transferred to the second level L2 cache memory 19. The memory controller 18 of FIG. 1 receives the requested address from the CPU bus and sends the requested address to a map comparator 193 included in a map refresh controller 194. The map comparator 193 compares the requested address with map addresses provided from the map memory 192 of the cache memory 19. If the requested address is found among the map addresses in the map memory, which is called a "hit", a cache line corresponding to the requested address or the selected map address is accessed in the data memory 191 by the CPU . If the requested address is not found in the map addresses in the map memory, a "miss" occurs and the requested address is sent to the main memory 15 of FIG. 1 to find the data corresponding to the requested address in the main memory.

The map refresh controller 194 is provided for refreshing data stored in the data memory 191 of the DRAM cache memory 19. The map refresh controller 194 is used to trace memory addresses requiring a data refresh process. To perform the data refresh process, the map refresh controller 194 also includes a refresh address generator 320 and a refresh counter 322.

Figure 3:
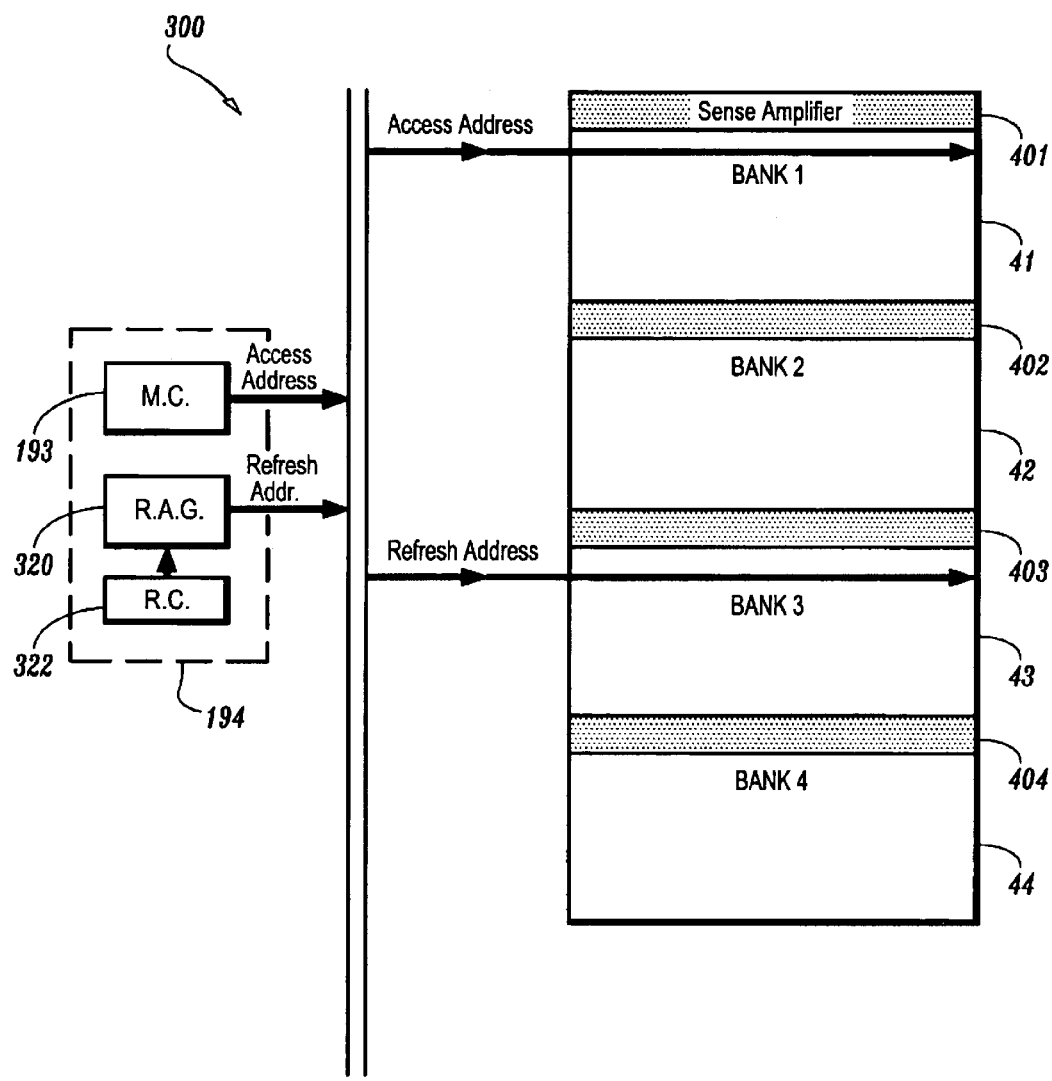
FIG. 3 shows a block diagram illustrating several memory banks of the DRAM memory of FIG. 2.

Turning now to FIG. 3, the reference numeral 300 generally indicates a DRAM data memory with word line addresses applied to the memory contents. The DRAM data memory 300 has multiple banks, 41, 42, 43 and 44, respectively, each bank having a corresponding sense amplifier, 401, 402, 403 and 404, respectively. Each bank is a collection of rows. Thus, the mapping is not necessarily restricted to an entire bank, but may cover a portion of a bank, such as, for example, one or more rows. Data stored in each of the banks may be accessed by a corresponding word line address. Assuming that a word line on which a read/write operation requested by the CPU 11 of FIG. 1 is to be performed is located in a first bank 41, the access address corresponding to the word line is provided to the first bank 41. In this exemplary embodiment, no refresh operation is allowed during normal access.

In a power-up mode of operation, the refresh address generator 320 generates refresh addresses for the first through fourth banks 41–44, respectively. The information needed for each bank during refresh is the corresponding refresh rate for that bank.

In a power-down mode of operation, one word line data in each of the non-disabled banks, such as, for example, just the second through third banks 42–43 of the cache memory, is accessed with each of the refresh addresses when the fourth bank is disabled or otherwise powered-down. For example, only the first through third banks 41–43 receive a refresh clock from the map refresh controller 194 and refresh counters 322, where the fourth bank 44 is determined to have a relatively shorter refresh time requirement. In the exemplary case of four banks 41–44, each bank is identified, for example, by the first two digits of an address to access a word line in the bank. In other words, the first two digits of a word line address may be '00', '01', '10', or '11', which designates the first 41, second 42, third 43, or fourth bank 44, respectively.

A refresh address generator 320 preferably includes a refresh counter 322, which provides refresh timing and addresses of word lines for each bank in which a refresh operation is to be performed. The refresh counter 322 is, for example, tracking the word line addresses for each bank to be refreshed. When one word line data is refreshed, the refresh counter 322 generates the next address of the bank for refresh. When all the word lines in the activated bank are refreshed, the refresh counter 322 will be reset to zero and starts to refresh the first word line again in the next refresh cycle. It shall be understood that in alternate embodiments where the disabled portions of memory do not comprise entire banks, the refresh counter may be initialized to one or more non-zero values. Assuming that a DRAM memory has 'n' banks, where n is four in this exemplary embodiment, and where each such bank stores data accessed by word line addresses, disabling of a bank during a power-down mode is performed with respect to a bank and data refresh operations can be performed with respect to the remaining n minus one banks simultaneously. In other words, no extra power is required to perform the data refresh operation with respect to the disabled banks in the cache memory. Therefore, power is conserved for data refresh operations in the DRAM cache memory due to fewer banks being refreshed at longer refresh intervals, where the disabled banks are chosen in order of their relatively shorter refresh intervals. It shall be understood that alternate embodiments may disable one or more portions of a bank or banks without disabling the entire bank or banks, especially in cases where the disabled portion or portions of the bank or banks are determined to require a shorter refresh period than the enabled portions.

Figure 4:
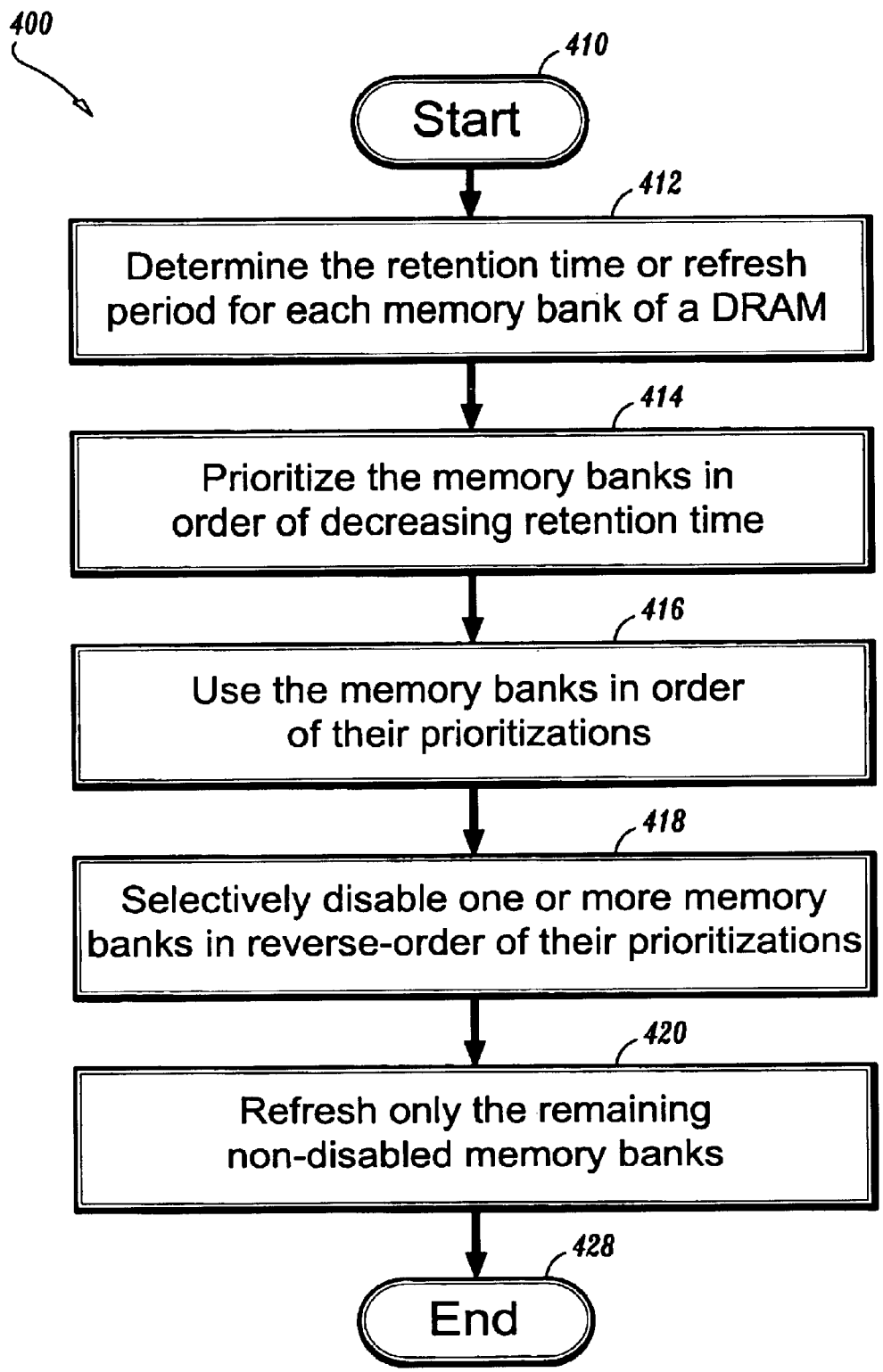
FIG. 4 shows a flow diagram for mapping memory bank addresses relative to memory bank retention times in DRAMs according to an exemplary embodiment of the present disclosure.

Turning now to FIG. 4, the reference numeral 400 generally indicates a flowchart for mapping memory bank addresses relative to memory bank retention times in DRAMs. A start block 410 passes control to a function block 412, which determines the maximum required refresh period for each of the memory banks, respectively. The function block 412, in turn, passes control to a function block 414, which prioritizes the memory banks in accordance with their respective refresh periods. The function block 414, in turn, passes control to a function block 416, which utilizes the memory banks in order of their respective prioritizations. The function block 416, in turn, passes control to a function block 418, which selectively disables at least one of the memory banks in reverse-order of their respective prioritizations. The function block 418, in turn, passes control to a function block 420, which refreshes only the remaining non-disabled memory banks, and passes control to an end block 428.

Thus, in operation, the exemplary method for mapping memory bank addresses relative to memory bank retention times in DRAMs includes determining the maximum required refresh period for each of the memory banks, respectively, prioritizing the memory banks in accordance with their respective refresh periods, utilizing the memory banks in order of their respective prioritizations, selectively disabling at least one of the memory banks in reverse-order of their respective prioritizations, and refreshing only the remaining non-disabled memory banks.

Some preferred and alternate embodiment methods can determine the respective maximum refresh period for each of said memory banks by actual testing of the memory cell retention times for each bank. These embodiments may test the memory cell retention times for each bank, in turn, with automatic self-testing by the DRAM. The automatic self-testing of the memory cell retention times by the DRAM may be performed periodically, or it may be performed in response to a temperature change of the DRAM. Determination of the maximum required refresh period for each of the memory banks may also include measuring the temperature of the DRAM and adjusting the tested memory cell retention times for each bank in accordance with a predicted offset for temperature.

Some preferred and alternate embodiment methods also include re-mapping the bank addresses of the memory banks in accordance with their respective prioritizations. The refreshing of only the remaining non-disabled memory banks may be performed separately for each non-disabled memory bank in accordance with its respective refresh period, or it may be performed simultaneously for each non-disabled memory bank in accordance with the minimum of their respective maximum required refresh periods.

Having described a method for refreshing only selected data banks in DRAM memories at potentially longer refresh intervals, modifications and variations may be made by those of ordinary skill in the pertinent art in light of the teachings of the present disclosure. These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

It is to be further understood that, because some of the constituent system components and methods depicted in the accompanying drawings are preferably implemented in firmware, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. Such changes and modifications are included within the scope and spirit of the present disclosure as set forth in the appended claims.

What is claimed is:

1. A method for refreshing data in a dynamic random access memory ("DRAM") having a plurality of memory banks, the method comprising:

determining the maximum required refresh period for each of said memory banks, respectively;

prioritizing said memory banks in accordance with their respective refresh periods;

utilizing said memory banks in order of their respective prioritizations;

selectively disabling at least one of said memory banks in reverse-order of their respective prioritizations;

refreshing only the remaining non-disabled memory banks and re-mapping the bank addresses of said memory banks in accordance with their respective prioritizations.

2. A method as defined in claim 1 wherein determining the respective maximum refresh period for each of said memory banks comprises testing of the memory cell retention times for each bank.

3. A method as defined in claim 2 wherein testing of the memory cell retention times for each bank comprises automatic self-testing by the DRAM.

4. A method as defined in claim 3 wherein the automatic self-testing of the memory cell retention times by the DRAM is performed periodically.

5. A method as defined in claim 3 wherein the automatic self-testing of the memory cell retention times by the DRAM is performed in response to a temperature change of the DRAM.

6. A method as defined in claim 2 wherein determining the maximum required refresh period for each of said memory banks further comprises: measuring the temperature of the DRAM; and adjusting the tested memory cell retention times for each bank in accordance with a predicted offset for temperature.

7. A method as defined in claim 1 wherein refreshing only the remaining non-disabled memory banks is performed separately for each non-disabled memory bank in accordance with its respective refresh period.

8. A method as defined in claim 1 wherein refreshing only the remaining non-disabled memory banks is performed simultaneously for each non-disabled memory bank in accordance with the minimum of their respective maximum required refresh periods.

9. A system for refreshing data in a dynamic random access memory ("DRAM"), the system comprising:

a data memory having a plurality of memory banks;

a map memory in signal communication with the data memory for translating an internal address of each of said plurality of memory banks into a corresponding external address;

a map comparator in signal communication with the map memory for selectively enabling a memory bank in accordance with its external address;

a refresh address generator in signal communication with the map comparator for selectively refreshing the enabled memory bank in accordance with its external address; and a refresh counter in signal communication with the refresh address generator for signaling a refresh in accordance with the maximum required refresh time of the enabled memory bank.

10. A system as defined in claim 9, further comprising a bank-specific sense amplifier in signal communication with the refresh counter, said bank-specific sense amplifier for amplifying the sense of a memory cell within a respective bank during a refresh of the memory cell.

11. A system for refreshing data in a dynamic random access memory ("DRAM") having a plurality of memory banks the system comprising:

counter means for determining the maximum required refresh period for each of said memory banks, respectively;

comparator means for prioritizing said memory banks in accordance with their respective refresh periods;

addressing means for utilizing said memory banks in order of their respective prioritizations;

switching means for selectively disabling at least one of said memory banks in reverse-order of their respective prioritizations;

generator means for refreshing only the remaining non-disabled memory banks; and mapping means for re-mapping the bank addresses of said memory banks in accordance with their respective prioritizations.

12. A system as defined in claim 11, further comprising testing means for testing of the memory cell retention times for each bank to determine the respective maximum refresh period for each of said memory banks.

13. A system as defined in claim 12, further comprising automatic self-testing means for automatic self-testing by the DRAM of the memory cell retention times for each bank.

14. A system as defined in claim 13, further comprising counter means for periodically performing the automatic self-testing of the memory cell retention times by the DRAM.

15. A system as defined in claim 13, further comprising temperature-sensing means for performing the automatic self-testing of the memory cell retention times in response to a temperature change of the DRAM.

16. A system as defined in claim 12, further comprising:

temperature-sensing means for measuring the temperature of the DRAM; and offset means for adjusting the tested memory cell retention times for each bank in accordance with a predicted offset for temperature to determine the maximum required refresh period for each of said memory banks.

17. A system as defined in claim 11, further comprising selective refresh means for refreshing only the remaining non-disabled memory banks separately for each non-disabled memory bank in accordance with its respective refresh period.

18. A system as defined in claim 11, further comprising batch refresh means for refreshing only the remaining non-disabled memory banks simultaneously for each non-disabled memory bank in accordance with the minimum of their respective maximum required refresh periods.

* * * * *

UNITED STATES PATENT AND TRADEMARK OFFICE
CERTIFICATE OF CORRECTION

| | |
|---|---|
| PATENT NO. | : 6,920,523 B2 |
| APPLICATION NO. | : 10/265964 |
| DATED | : July 19, 2005 |
| INVENTOR(S) | : Le et al. |

It is certified that error appears in the above-identified patent and that said Letters Patent is hereby corrected as shown below:

In Claim 1, at Column 6, Line 67, please replace "banks and" with -- banks; and --.

In Claim 11, at Column 8, Line 3, please replace "banks the" with -- banks, the --.

Signed and Sealed this

Thirteenth Day of November, 2007

JON W. DUDAS
*Director of the United States Patent and Trademark Office*